M. J. ALLEN.
EDUCATIONAL GAME FOR TEACHING MUSIC.
APPLICATION FILED APR. 30, 1921.
1,406,960.
Patented Feb. 21, 1922.
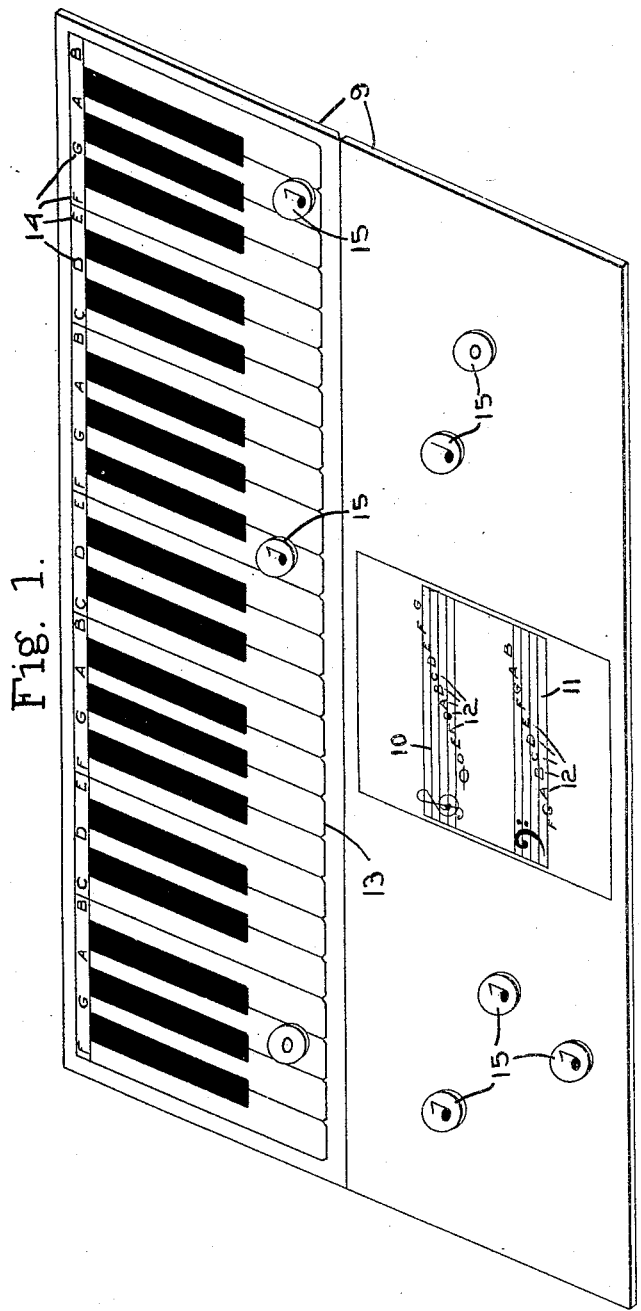
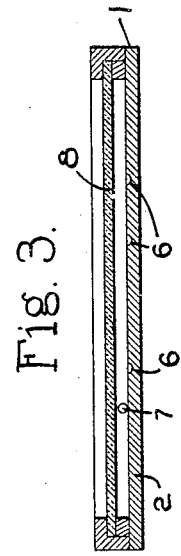
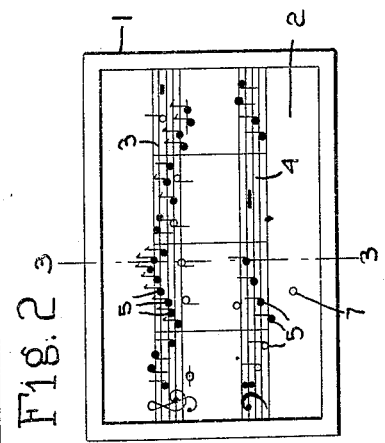
Inventor.
Mabelle J. Allen
by Heard Smith & Tennant.
Attys.

UNITED STATES PATENT OFFICE.

MABELLE J. ALLEN, OF BOSTON, MASSACHUSETTS.

EDUCATIONAL GAME FOR TEACHING MUSIC.

1,406,960.   Specification of Letters Patent.   Patented Feb. 21, 1922.

Application filed April 30, 1921. Serial No. 465,942.

*To all whom it may concern:*

Be it known that I, Mrs. MABELLE J. ALLEN, a citizen of the United States, and resident of Boston, county of Suffolk, State of Massachusetts, have invented an Improvement in Educational Games for Teaching Music, of which the following description, in connection with the accompanying drawing, is a specification, like characters on the drawing representing like parts.

This invention relates to educational games and particularly to a game which is designed to teach children the rudiments of music, such for instance, as the location of the notes of the scale on the musical staff, the location of the corresponding notes on the key board of a piano or similar instruments, and the manner in which time is represented by musical notes.

My educational game is constructed so that it can be played by anyone without the least knowledge of music but in playing the game the player will unconsciously and without effort learn the rudiments of music. By means of my game these rudiments may be learned by a small child without the drudgery which usually accompanies the acquirement of such knowledge.

My improved game comprises means for selecting at random anyone of a plurality of different notes on a musical staff, a chart on which is imprinted a musical staff having the letters indicating the notes of the scale imprinted thereon and also having a representation of a key board of a piano with the notes indicated by proper letters.

In playing the game the operator will select at random a note on a musical staff and note the position thereof on the staff. He will then, from the chart, observe the letter by which said note is indicated and after acquiring this knowledge he can locate on the representation of the key board the key having the corresponding letter. This is all done by the child as a pastime but as the same time he very soon absorbs the rudiments of music above referred to.

In order to give an understanding of my invention I have illustrated in the drawings a selected embodiment thereof which will now be described after which the novel features will be pointed out in the appended claims.

Fig. 1 is a perspective view of the board or chart having imprinted thereon the musical staff and representation of the key board.

Fig. 2 is a view of the device for selecting at random a note.

Fig. 3 is an enlarged section on the line 3—3, Fig. 2.

My invention contemplates the use of any appropriate device for enabling a child to select at random a note on a musical staff but in order to make the game interesting I have provided a device in which the musical staff with the notes thereon is imprinted on a board which is made with pockets where the heads of the notes are located and I employ a ball which may be rolled over the surface of the board and in such a way that it will become lodged in one of the pockets. The note corresponding to this pocket is the note which is selected. This selecting device is indicated generally at 1 and it comprises a board 2 having imprinted thereon a musical staff and notes arranged on the staff. I will preferably place on the board 2 musical staffs indicated at 3 and 4 respectively. One staff bears the treble clef and the other the bass clef. The notes which are imprinted on these staffs are indicated at 5 and they may be notes of the same or of different time value but preferably of different time value. The board 2 is formed with a pocket 6 at the point where the head of each note is imprinted, said pockets being of a size to receive a ball 7 which may be rolled freely over the surface of the board. In order to prevent the ball from becoming lost I will preferably provide the board with a glass cover 8 but this cover is not essential although is highly desirable where the game is to be used by small children. If the board is held in the hand and rocked or tilted slightly the ball will roll from one point to another on the board and will finally become lodged in one of the pockets 6 thus arbitrarily making a selection of one of the notes for the child.

The other part of the game with which the board 1 is used is the chart shown in Fig. 1 and for convenience this may be placed on a cardboard or stiff backing 9. This chart has imprinted thereon two musical staffs 10 and 11, one bearing the treble clef and the other the base clef and each staff has imprinted on it the letters indicating the notes of the scale as shown at 12.

The chart also has imprinted thereon the representation of a key board of a piano as shown at 13 and the notes of the diatonic scale are indicated by the appropriate letters at the top of the chart as shown at 14.

In using the game the player will manipulate the board once until the ball 7 rolls into one of the pockets 6, thus selecting arbitrarily one of the notes. The position of this note on the staff is carefully observed by the player and he will then find the same location on the corresponding staff 10 or 11 on the chart. The letters imprinted on these staffs 10 and 11 will give the player the letter by which said note is designated.

Having learned the letter corresponding to the selected note the player will then find the corresponding letter in the space 14 at the supper side of the key board, and this will give the player the location on the key board of the key corresponding to the selected note.

The selecting of the note on the board 1, the act of finding the corresponding note on the chart and in subsequently finding the corresponding key on the chart provides a fascinating entertainment for the player and in performing these acts a small child will soon learn the location of the notes of the scale on the staff and the letters by which they are designated and will also learn the location of the notes on the key board of a piano.

I may, if desired, employ "men" or movable blocks in connection with the game. Such blocks are indicated at 15 and each will preferably be in the form of a round disk having imprinted on its face a musical note. Some of these "men" will have the whole note imprinted thereon, others the half note, others the quarter note, others the sixteenth note.

This feature of the invention is used to teach the children the relative value of the notes.

It will be observed that the notes on the board 1 are of different value and in manipulating said board the ball 7 may roll into a pocket located on a quarter note or into a pocket located on a whole note or one indicating an eighth note.

Assuming for the sake of illustration that the ball rolls into a pocket belonging to an eighth note, then after the player has located the proper key on the key board corresponding to the note in which the ball has been caught, he will select from his "men" one having an eighth note imprinted thereon and place this eighth note on the corresponding key of the key board. He may then select another note with the ball 7 and after locating the proper note on the key board will select another "man" bearing on its face a note of the same value as that selected by the ball and then place this note on the proper key. In this way the child will learn not only the relative value of the notes but also the position and designation of the notes of the staff and the position of the notes of the scale on a key board of a piano.

I claim.

1. An educational game comprising means for selecting at random a note on a musical staff, in combination with a chart having imprinted thereon a musical staff with the letters of the scale and also a representation of a key board of a musical instrument with the keys indicated by the appropriate letters whereby upon comparing the position on the staff of the selected note with the staff of the chart the pitch of the note may be determined and by comparing said note on the chart with the key board the location of the note on the key board may be determined.

2. In an educational game, the combination with means for selecting at random a note on either of two staffs bearing the treble clef and bass clef respectively, of a chart having imprinted thereon two musical staffs, one bearing the treble clef and the other the bass clef and each having the letters of the scale thereon, said chart also having a representation of a key board with the keys indicated by the appropriate letters.

3. An educational game, comprising a board having imprinted thereon a musical staff with notes, said board having pockets formed therein at the heads of the notes and a ball adapted to roll over said board and become lodged in one of said pockets thereby selecting a note, in combination with a chart having imprinted thereon a musical staff with the letters of the scale and also the representation of a key board of a piano with the keys indicated by letters.

4. An educational game, comprising a board having imprinted thereon a musical staff with notes, said board having pockets formed therein at the heads of the notes and a ball adapted to roll over the board and become lodged in one of said pockets thereby selecting a note, in combination with a chart having imprinted thereon a musical staff with the letters of the scale and also the representation of a key board of a piano with the keys indicated by letters, and movable "men" adapted to be placed on the keys and each bearing the imprint of a note.

In testimony whereof, I have signed my name to this specification.

MABELLE J. ALLEN.